US012772176B2

(12) United States Patent
Wang et al.

(10) Patent No.: US 12,772,176 B2
(45) Date of Patent: Oct. 20, 2026

(54) UPLINK POWER COMPENSATION

(71) Applicant: QUALCOMM INCORPORATED, San Diego, CA (US)

(72) Inventors: Xinyu Wang, Beijing (CN); Jianming Zhu, Acton, MA (US); Yuyu Yan, Beijing (CN); Rebecca Wen-Ling Yuan, San Diego, CA (US); Brahim Saadi, Nuremberg (DE); Enoch Shiao-Kuang Lu, San Diego, CA (US); Deepak Wadhwa, San Diego, CA (US); Nachiket Nanadikar, San Diego, CA (US); Dinesh Kumar Devineni, San Diego, CA (US); Sanghoon Kim, San Jose, CA (US); Minghong Tang, Shanghai (CN); Jie Mao, Beijing (CN); Ling Xie, Beijing (CN); Xiuqiu Xia, Shanghai (CN)

(73) Assignee: QUALCOMM Incorproated, San Diego, CA (US)

( * ) Notice: Subject to any disclaimer, the term of this patent is extended or adjusted under 35 U.S.C. 154(b) by 222 days.

(21) Appl. No.: 18/721,826

(22) PCT Filed: Feb. 24, 2022

(86) PCT No.: PCT/CN2022/077562
§ 371 (c)(1),
(2) Date: Jun. 19, 2024

(87) PCT Pub. No.: WO2023/159409
PCT Pub. Date: Aug. 31, 2023

(65) Prior Publication Data

US 2025/0063511 A1 Feb. 20, 2025

(51) Int. Cl.
*H04W 52/14* (2009.01)
*H04L 5/00* (2006.01)

(52) U.S. Cl.
CPC ......... *H04W 52/146* (2013.01); *H04L 5/0048* (2013.01)

(58) Field of Classification Search
CPC ............. H04W 52/146; H04W 52/228; H04W 52/362; H04W 52/50; H04W 52/242;
(Continued)

(56) References Cited

U.S. PATENT DOCUMENTS 9,407,096 B2 * 8/2016 Park ........................ H02J 13/12
11,523,347 B2 * 12/2022 Su ........................ H04B 17/328
(Continued)

FOREIGN PATENT DOCUMENTS

CN 104509180 A 4/2015
CN 111316708 A 6/2020
(Continued)

OTHER PUBLICATIONS

International Search Report and Written Opinion—PCT/CN2022/077562—ISA/EPO—Nov. 15, 2022.
(Continued)

*Primary Examiner* — Andrew Wendell
(74) *Attorney, Agent, or Firm* — Holland & Hart LLP

(57) ABSTRACT

Methods, systems, and devices for wireless communication are described. A network node may transmit a first message using a first transmit power based on a first set of values corresponding to a set of power control parameters. The set of power control parameters may include an accumulated transmit power control parameter. The network node may receive a second message including information indicative of at least one of a second set of values corresponding to the set of power control parameters. The network node may transmit a third message using a second transmit power based on a value corresponding to the accumulated transmit power control parameter. The value may correspond to the
(Continued)

accumulated transmit power control parameter, which may be based on a first difference between one or more of the first set of values from before the second message and one or more of the second set of values.

15 Claims, 9 Drawing Sheets

(58) Field of Classification Search
CPC ..... H04W 52/32; H04W 52/38; H04W 52/40; H04L 5/0048
See application file for complete search history.

(56) References Cited

U.S. PATENT DOCUMENTS

2012/0208589 A1 8/2012 Kiyoshima et al.
2016/0007300 A1* 1/2016 Suzuki .................. H04W 52/18 370/329
2020/0178185 A1 6/2020 Jeons et al.
2020/0367175 A1* 11/2020 Fukui ..................... H04B 7/024
2021/0168728 A1* 6/2021 Liu ..................... H04W 52/146
2021/0306987 A1* 9/2021 Takeda .................. H04W 52/54
2022/0030521 A1* 1/2022 Cirik ..................... H04L 5/0048
2022/0338130 A1* 10/2022 Anderson ............. H04W 52/06

FOREIGN PATENT DOCUMENTS

CN 111757447 A 10/2020
JP 2017076995 A 4/2017
WO WO-2016045130 A1 3/2016
WO WO-2018044652 A1 3/2018
WO WO-2022021208 A1 2/2022

OTHER PUBLICATIONS

Supplementary European Search Report EP22927700 Search Authority the Hague Nov. 13, 2025.

* cited by examiner

UPLINK POWER COMPENSATION

CROSS REFERENCE

The present Application is a 371 national stage filing of International PCT Application No. PCT/CN2022/077562 by Wang et al. entitled "UPLINK POWER COMPENSATION," filed Feb. 24, 2022, which is assigned to the assignee hereof, and which is expressly incorporated by reference in its entirety herein.

BACKGROUND

The following relates to wireless communications, and more particularly to power control for the wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Aspects of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network nodes, which may be known as network entities, base stations, user equipments (UEs), each supporting wireless communications.

SUMMARY

The described techniques relate to improved methods, systems, nodes, devices, and apparatuses that support power control for wireless communications. A user equipment (UE) may determine whether to reset an accumulated transmit power control parameter to a null value (i.e., a value that is equal to or is associated with the value zero) or a non-null value (i.e., a value that is not equal to or associated with the value zero). For example, the UE may determine a first set of values for a set of power control parameters before reception of a message from a network entity, and a second set of values for the set of power control parameters after the reception of the message from the network entity. The UE may determine a value for the accumulated transmit power control parameter based on a difference between the first set of values and the second set of values. If the difference is greater than a threshold, the UE may set the value for the accumulated transmit power control parameter to be equal to the difference. This ensures that the uplink transmit power for subsequent transmission of messages by the UE is not lower than an uplink transmit power from before the reception of the message from the network entity.

A method for wireless communication at a network node is described. The method may include transmitting a first message using a first transmit power based on a first set of multiple values corresponding to a set of multiple power control parameters, where the set of multiple power control parameters includes an accumulated transmit power control parameter, receiving a second message including information indicative of at least one of a second set of multiple values corresponding to the set of multiple power control parameters, and transmitting a third message using a second transmit power based on a value corresponding to the accumulated transmit power control parameter, where the value corresponding to the accumulated transmit power control parameter is based on a first difference between one or more of the first set of multiple values from before the second message and one or more of the second set of multiple values.

A network node for wireless communication is described. The network node may include a memory; and at least one processor coupled to the memory, wherein the at least one processor is configured to transmit a first message using a first transmit power based on a first set of multiple values corresponding to a set of multiple power control parameters, where the set of multiple power control parameters includes an accumulated transmit power control parameter, receive a second message including information indicative of at least one of a second set of multiple values corresponding to the set of multiple power control parameters, and transmit a third message using a second transmit power based on a value corresponding to the accumulated transmit power control parameter, where the value corresponding to the accumulated transmit power control parameter is based on a first difference between one or more of the first set of multiple values from before the second message and one or more of the second set of multiple values.

Another network node for wireless communication is described. The apparatus may include means for transmitting a first message using a first transmit power based on a first set of multiple values corresponding to a set of multiple power control parameters, where the set of multiple power control parameters includes an accumulated transmit power control parameter, means for receiving a second message including information indicative of at least one of a second set of multiple values corresponding to the set of multiple power control parameters, and means for transmitting a third message using a second transmit power based on a value corresponding to the accumulated transmit power control parameter, where the value corresponding to the accumulated transmit power control parameter is based on a first difference between one or more of the first set of multiple values from before the second message and one or more of the second set of multiple values.

A non-transitory computer-readable medium having code for wireless communication stored thereon that, when executed by a network node, causes the network node to transmit a first message using a first transmit power based on a first set of multiple values corresponding to a set of multiple power control parameters, where the set of multiple power control parameters includes an accumulated transmit power control parameter, receive a second message including information indicative of at least one of a second set of multiple values corresponding to the set of multiple power control parameters, and transmit a third message using a second transmit power based on a value corresponding to the accumulated transmit power control parameter, where the value corresponding to the accumulated transmit power control parameter is based on a first difference between one or more of the first set of multiple values from before the second message and one or more of the second set of multiple values.

In some aspects of the method, apparatuses, and non-transitory computer-readable medium described herein, the value of the accumulated transmit power control parameter may be equal to the first difference based on the first difference being greater than a threshold.

In some aspects of the method, apparatuses, and non-transitory computer-readable medium described herein, the value of the accumulated transmit power control parameter may be different from a reset value of the accumulated transmit power control parameter.

In some aspects of the method, apparatuses, and non-transitory computer-readable medium described herein, the reset value corresponds to a respective second value of the second set of multiple values.

In some aspects of the method, apparatuses, and non-transitory computer-readable medium described herein, the reset value may be zero.

In some aspects of the method, apparatuses, and non-transitory computer-readable medium described herein, the value of the accumulated transmit power control parameter may be different from a respective value of the second set of multiple values.

In some aspects of the method, apparatuses, and non-transitory computer-readable medium described herein, the set of multiple power control parameters includes a path loss parameter and a target receive power parameter.

In some aspects of the method, apparatuses, and non-transitory computer-readable medium described herein, the first difference may be irrespective of at least one of a resource allocation or a transmission format.

In some aspects of the method, apparatuses, and non-transitory computer-readable medium described herein, the value of the accumulated transmit power control parameter may be equal to the first difference based on the first difference being less than or equal to a threshold.

In some aspects of the method, apparatuses, and non-transitory computer-readable medium described herein, the value of the accumulated transmit power control parameter may be a reset value of the power control parameter.

In some aspects of the method, apparatuses, and non-transitory computer-readable medium described herein, the reset value corresponds to a respective second value of the second set of multiple values.

In some aspects of the method, apparatuses, and non-transitory computer-readable medium described herein, the reset value may be zero.

In some aspects of the method, apparatuses, and non-transitory computer-readable medium described herein, the second message may be a radio resource control connection setup message and the third message may be a radio resource control connection setup complete message.

In some aspects of the method, apparatuses, and non-transitory computer-readable medium described herein, the second message may be a radio resource control reconfiguration message and the third message may be a radio resource control reconfiguration complete message.

In some aspects of the method, apparatuses, and non-transitory computer-readable medium described herein, the accumulated transmit power control parameter corresponds to a ramping offset for a respective transmit power of the network node.

In some aspects of the method, apparatuses, and non-transitory computer-readable medium described herein, the ramping offset may be a sum of one or more previously received transmit power control parameter.

In some aspects of the method, apparatuses, and non-transitory computer-readable medium described herein, the first difference may be indicative of a reset of the accumulated transmit power control parameter.

In some aspects of the method, apparatuses, and non-transitory computer-readable medium described herein, one or more of the second set of multiple values and one or more values based on one or more of the second set of multiple values.

DETAILED DESCRIPTION

Figure 1:
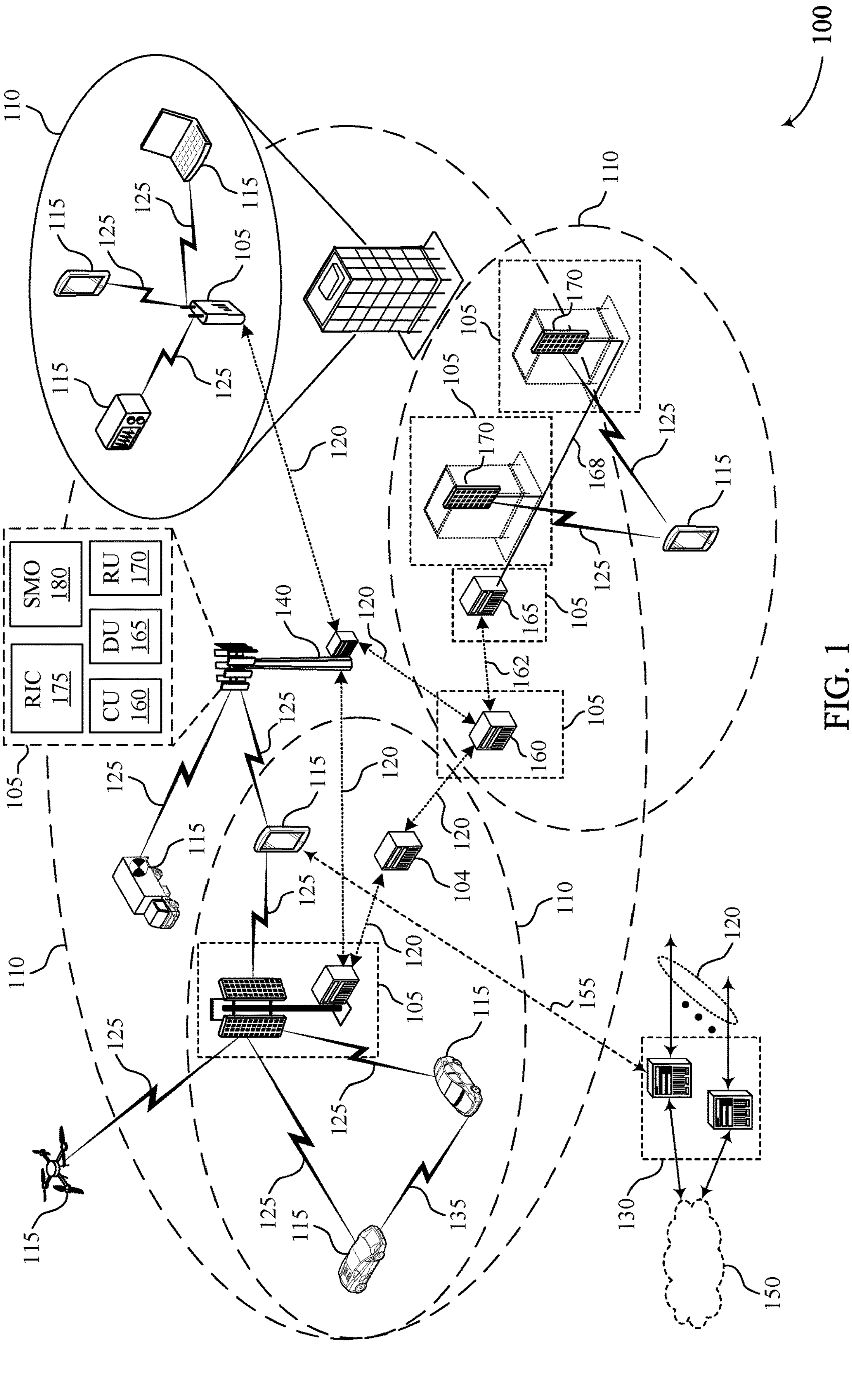
FIGS. 1 and 2 illustrate aspects of wireless communications systems that support power control for wireless communications in accordance with one or more aspects of the present disclosure.

Some wireless communications systems may include network nodes, such as a user equipment (UE) or a network entity (e.g., an eNodeB (eNB), a gNodeB (gNB), a base station, or some other network entity), that support one or more radio access technologies. Aspects of radio access technologies include fourth generation (4G), such as Long Term Evolution (LTE) systems, and fifth generation (5G), which may be referred to as New Radio (NR), or other radio access technologies, including future radio access technologies not explicitly mentioned herein. A UE may support exchange of one or more messages to support various operations at the UE. For example, a UE and a network entity may exchange one or more messages for a radio resource control (RRC) connection establishment, an RRC configuration, or an RRC reconfiguration, or the like. Additionally, the UE and the network entity may support uplink power control operations to promote power saving at the UE, as well as higher reliability wireless communications between the UE and the network entity. As part of the uplink power control operations, the UE and the network entity may determine an uplink transmit power, for example, for exchange of one or more messages by the UE over an uplink channel (e.g., a physical uplink shared channel (PUSCH)).

For example, the UE may transmit, to the network entity, a message using an uplink transmit power. The uplink transmit power may be based on a respective set of values corresponding to a set of power control parameters. In response to the transmitted message, the UE might not receive any subsequent message from the network entity and may determine that the transmitted message was not received at the network entity. As a result, the UE may increment its uplink transmit power and retransmit the message using a higher uplink transmit power compared to the earlier transmission of the message. At least one of the power control parameters used by the UE to determine the uplink transmit power may be an accumulated transmit power control parameter. In some cases, the accumulated transmit power control parameter may be reset. As a result, the uplink transmit power for transmission of subsequent message may be based on a null value of the accumulated transmit power control parameter, which may result in subsequent transmissions of messages by the UE not being unreachable by the network entity.

Various aspects of the described techniques relate to power control at the UE. In the case where the accumulated transmit power control parameter is reset, the UE may determine whether to reset the accumulated transmit power control parameter to null value or a non-null value. For example, the UE may determine a first set of values for the set of power control parameters before the reception of the message from the network entity, and a second set of values for the set of power control parameters after the reception of the message from the network entity. The UE may determine a value for the accumulated transmit power control parameter based on a difference between the first set of values and the second set of values. If the difference is greater than a threshold, the UE may set the value for the accumulated transmit power control parameter to be equal to the difference. This ensures that the uplink transmit power for subsequent transmission of messages by the UE is not lower than the uplink transmit power from before the reception of the message from the network entity.

Aspects of the disclosure are initially described in the context of wireless communications systems. Aspects of the disclosure are further illustrated by and described with reference to apparatus diagrams, system diagrams, and flowcharts that relate to power control for wireless communications.

FIG. 1 illustrates an aspect of a wireless communications system 100 that supports power control for wireless communications in accordance with one or more aspects of the present disclosure. The wireless communications system 100 may include one or more network entities 105, one or more UEs 115, and a core network 130. In some aspects, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various aspects, a network entity 105 may be referred to as a network element, a mobility element, a radio access network (RAN) node, or network equipment, among other nomenclature. In some aspects, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an aspect of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node, which may be referred to as a node, a network node, a network entity, or a wireless node, may be a base station (e.g., any base station described herein), a UE (e.g., any UE described herein), a network controller, an apparatus, a device, a computing system, one or more components, an IAB node, a DU, a CU, an RU, any component of a UE, any component of a base station, and/or another suitable processing entity configured to perform any of the techniques described herein. For example, a network node may be a UE 115. As another example, a network node may be a base station or network entity 105. As another example, a first network node may be configured to communicate with a second network node or a third network node. In one aspect of this example, the first network node may be a UE 115, the second network node may be a base station (e.g., a network entity 105), and the third network node may be a UE 115. In another aspect of this example, the first network node may be a UE 115, the second network node may be a base station (e.g., a network entity 105), and the third network node may be a base station (e.g., a network entity 105). In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE 115 is configured to receive information from a base station (e.g., a network entity 105) also discloses that a first network node is configured to receive information from a second network node. Consistent with this disclosure, once a specific example is broadened in accordance with this disclosure (e.g., a UE 115 is configured to receive information from a base station (e.g., a network entity 105) also discloses that a first network node is configured to receive information from a second network node), the broader example of the narrower example may be interpreted in the reverse, but in a broad open-ended way. In the example above where a UE 115 being configured to receive information from a base station (e.g., a network entity 105) also discloses that a first network node being configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a first one or more components, a first processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some aspects, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some aspects, network entities 105 may communicate with one another over a backhaul communication link 120 (e.g., in accordance with an X2, Xn, or other interface protocol) either directly (e.g., directly between network entities 105) or indirectly (e.g., via a core network 130). In some aspects, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other aspects or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, a node, a network node, or other suitable terminology). In some aspects, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some aspects, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some aspects, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some aspects, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some aspects, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some aspects, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support power control for wireless communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may also include or may be referred to as a node or a network node. A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some aspects, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some aspects, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some aspects, the wireless communications system 100 may include network entities 105 or UEs 115 that support concurrent communications via carriers associated with multiple carrier bandwidths. In some aspects, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some aspects, a UE 115 may be configured with multiple BWPs. In some aspects, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some aspects, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some aspects, a network entity 105 (e.g., a base station 140, an RU 170) may be movable and therefore provide communication coverage for a moving coverage area 110. In some aspects, different coverage areas 110 associated with different technologies may overlap, but the different coverage areas 110 may be supported by the same network entity 105. In some other aspects, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some aspects, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some aspects, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Aspects of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some aspects, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some aspects, a UE 115 may be able to communicate directly with other UEs 115 over a device-to-device (D2D) communication link 135 (e.g., in accordance with a peer-to-peer (P2P), D2D, or sidelink protocol). In some aspects, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some aspects, one or more UEs 115 in such a group may be outside the coverage area 110 of a network entity 105 or may be otherwise unable to or not configured to receive transmissions from a network entity 105. In some aspects, groups of the UEs 115 communicating via D2D communications may support a one-to-many (1:M) system in which each UE 115 transmits to each of the other UEs 115 in the group. In some aspects, a network entity 105 may facilitate the scheduling of resources for D2D communications. In some other aspects, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some aspects, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some aspects, antennas or antenna arrays associated with a network entity 105 may be in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some aspects, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some aspects, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some aspects, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some aspects, a device may support same-slot HARQ feedback, where the device may provide HARQ feedback in a specific slot for data received in a previous symbol in the slot. In some other aspects, the device may provide HARQ feedback in a subsequent slot, or according to some other time interval.

In the wireless communications system 100, a network node, such as a network entity 105, a base station 140, a UE 115 may support an RRC procedure to support various operations at the network node. During an RRC procedure, the network entity 105 and the UE 115 may exchange one or more messages for an RRC connection establishment, an RRC configuration, an RRC reconfiguration, or the like. Additionally, in the wireless communications system 100, the network entity 105 and the UE 115 may support uplink power control operations to provide power saving at the UE 115, as well as higher reliability wireless communications between the network entity 105 and the UE 115. As part of the uplink power control operations, the UE 115 may be triggered to reset an uplink transmit power. In some cases, due to the UE 115 resetting the uplink transmit power, the network entity 105 may be unreachable by the UE 115 using the reset uplink transmit power.

For example, during the RRC procedure, the UE 115 may transmit an RRC message, such as msg3 according to a first uplink transmit power value. The UE 115 may then receive from the network entity 105 an RRC message, such as msg4 that may trigger (or signal) to the UE 115 to reset the uplink transmit power. Because the rest uplink transmit power may be a lower uplink transmit power, when the UE 115 transmits a subsequent RRC message, such as msg5, the RRC message may not reach the network entity 105. As a result, the wireless communication may be impacted by the sub-optimal uplink power control adjustment at the UE 115. Additionally, the UE 115 may experience longer latency for a successful transmission of the subsequent RRC message as the UE 115 ramps up the uplink transmit power to a sufficient value.

The UE 115 may transmit a first message (e.g., a msg3) using a first transmit power that may be based on a set of power control parameters. At least one of the power control parameters may be an accumulated transmit power control parameters that may reset the transmit power of the UE 115. The UE 115 may receive a second message (e.g., a msg4), which may include information indicative of a change to one or more power control information elements (IEs) at the UE 115. The UE 115 may transmit a third message (e.g., msg5) using a second transmit power that may be based on the set of power control parameters. A value of the accumulated transmit power control parameter may be based on a difference (e.g., a power delta) between one or more first values of the set of power control parameters before the second message (e.g., reception of msg4) and one or more second values of the set of power control parameters after the second message (e.g., reception of msg4).

In some aspects, if the difference (e.g., the power delta) is greater than zero, the UE 115 may initialize the accumulated transmit power control parameter at the UE 115 based on the power delta value. Otherwise, the UE 115 may initialize the accumulated transmit power control parameter at the UE 115 based on a default value (e.g., a reset value). By initializing the accumulated transmit power control parameter at the UE 115 based on the power delta value, the UE 115 may improve the reliability of the transmission of the third RRC message (e.g., msg5) to the network entity 105 by providing sufficient transmit power to the transmission or ramping up the transmit power value for the transmission earlier.

Figure 2:
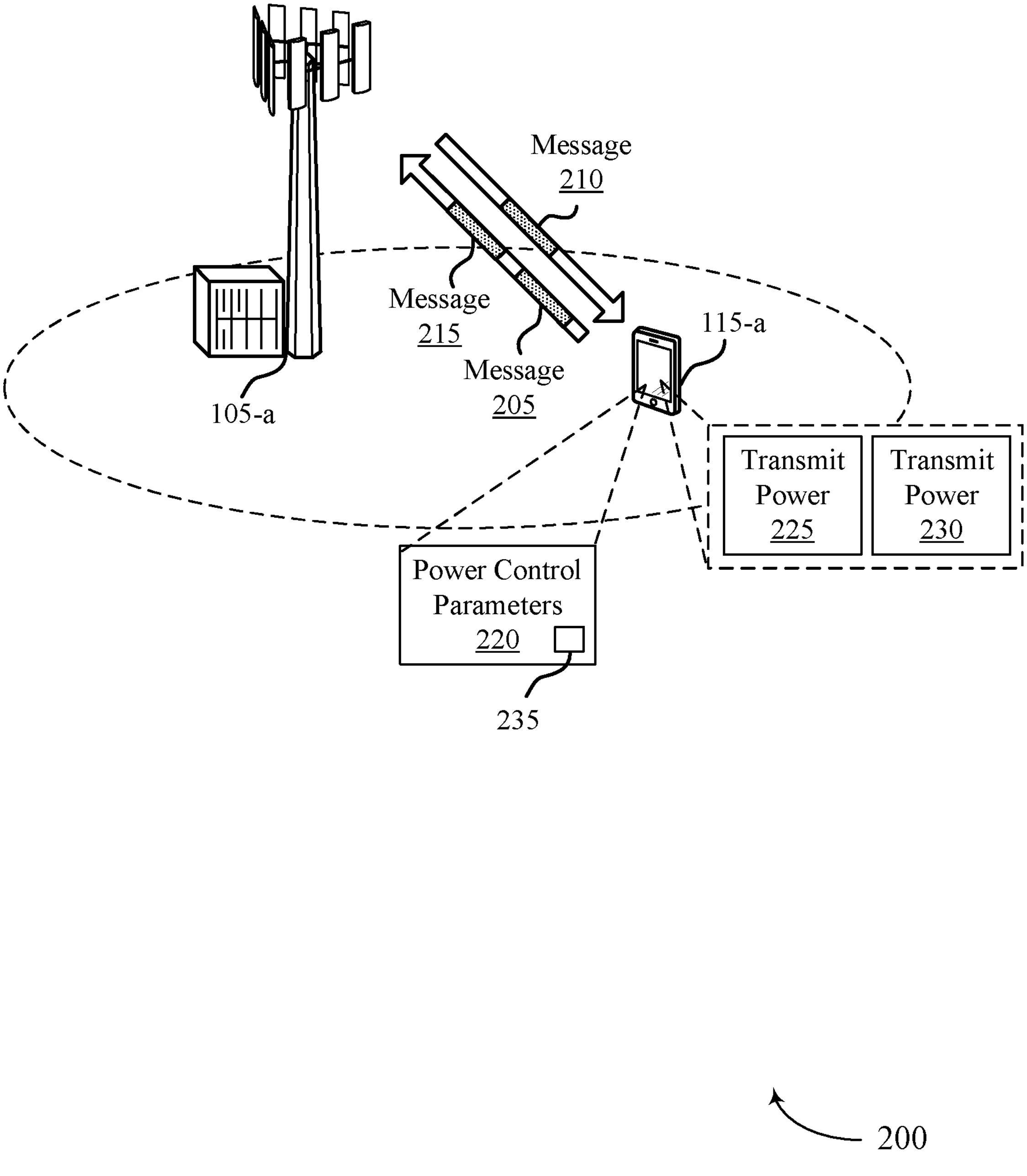

FIG. 2 illustrates an aspect of a wireless communications system 200 that supports power control for wireless communications in accordance with one or more aspects of the present disclosure. The wireless communications system 200 may implement or be implemented by aspects of the wireless communications system 100. For example, the wireless communications system 200 may include a UE 115-*a* and a network entity 105-*a*, which may be aspects of a UE 115 and a network entity 105 as described with reference to FIG. 1. In some aspects, the wireless communications system 200 may be an LTE network, an LTE-A network, an LTE-A Pro network, an NR network, or a network operating in accordance with other systems and radio technologies, including future systems and radio technologies not explicitly mentioned herein. The wireless communications system 200 may support power saving, and, in some aspects, may promote higher reliability and lower latency wireless communications.

The UE 115-*a* and the network entity 105-*a* may support exchange of one or more messages to support various operations at the UE 115-*a* and the network entity 105-*a*. For example, the UE 115-*a* and the network entity 105-*a* may exchange one or more messages (e.g., a message 205, a message 210, a message 215, etc.) for an RRC connection establishment, an RRC configuration, or an RRC reconfiguration, or the like. In some aspects, the message 210 may be an RRC connection setup message and the message 215 may be an RRC connection setup complete message. In some other aspects, the message 210 may be an RRC reconfiguration message and the message 215 may be an RRC reconfiguration complete message. Additionally, in the wireless communications system 200, the UE 115-*a* and the network entity 105-*a* may support power control operations to promote power saving at the UE 115-*a*, as well as higher reliability wireless communications between the UE 115-*a* and the network entity 105-*a*. As part of the power control operations, the UE 115-*a* and the network entity 105-*a* may determine an uplink transmit power, for example, for exchange of one or more messages by the UE 115-*a* over an uplink channel (e.g., a physical uplink shared channel (PUSCH)).

The UE 115-*a* may determine an uplink transmit power $P_{PUSCH,b,f,c}(i, j, q_d, l)$ for PUSCH, according to Equation (1), where $P_{CMAX,f,x}(i)$ represents a maximum transmit power value for the UE 115-*a*, $P_{O_{PUSCH},b,f,c}(j)$ represents a received power value at the network entity 105-*b*, $$2^{\mu} \cdot M_{RB,b,f,c}^{PUSCH}(j)$$

represents a PUSCH bandwidth value expressed in terms of resource blocks, $\alpha_{b,f,c}(j)$ represents a fractional power control value, $PL_{b,f,c}(q_d)$ represents a path loss value, $\Delta_{TF,b,f,c}(i)$ represents a transmission format value, and $f_{b,f,c}(i, l)$ represents an accumulated transmit power control value.

$$\min\left\{\begin{array}{c} P_{CMAX,f,x}(i), \\ P_{O_{PUSCH},b,f,c}(j) + 10\log_{10}\left(2^{\mu} \cdot M_{RB,b,f,c}^{PUSCH}(j) + \right. \\ \left. \alpha_{b,f,c}(j) \cdot PL_{b,f,c}(q_d) + \Delta_{TF,b,f,c}(i) + f_{b,f,c}(i, l)\right) \end{array}\right\} \quad (1)$$

One or more elements of Equation (1) may be referred to as power control parameters 220 and each of one or more of these power control parameters 220 may be part of the determination of the uplink transmit power for the UE 115-*a*.

The UE 115-*a* may transmit, and the network entity 105-*a* may receive, the message 205 using a first uplink transmit power 225. The first uplink transmit power 225 may be based on a first set of values corresponding to the power control parameters 220. The network entity 105-*a* may transmit, and the UE 115-*a* may receive the message 210, which may include information indicative of a second set of values corresponding to the power control parameters 220. The UE 115-*a* may transmit, and the network entity 105-*a* may receive, the message 215 using a second uplink transmit power 230 based on the second set of values corresponding to the power control parameters 220. With reference to Equation (1), at least one of the power control parameters 220 used by the UE 115-*a* to determine the uplink transmit power may be an accumulated transmit power control parameter 235 (e.g., $f_{b,f,c}(i, l)$) also referred to as tpc-Accumulation. The accumulated transmit power control parameter 235 may correspond to a ramping offset for a respective uplink transmit power of the UE 115-*a*. The ramping offset may be a sum of one or more previously received transmit power control parameters 220.

The accumulated transmit power control parameter 235 may be reset. As a result, the second uplink transmit power 230 for transmission of the message 215 may be based on a null value of the accumulated transmit power control parameter 235. In some aspects, the message 210 may include a power control information element (IE) (e.g., a PUSCH-PowerControl IE), which may, by default, trigger the reset for the accumulated transmit power control parameter 235 without any changes to one or more values of the power control parameters 220. The second uplink transmit power 230 for the transmission of the message 215, by the UE 115-*a*, may thereby be lower compared to the first uplink transmit power 225 for the transmission of the message 205 by the UE 115-*a*. Due to the reset of the accumulated transmit power control parameter 235, the message 215 may not be received by the network entity 105-*a* because the UE 115-*a* used a lower uplink transmit power. In some other aspects, the UE 115-*a* may reset the accumulated transmit power control parameter 235 based on a change to one or more of the power control parameters 220 (e.g., a configuration for a corresponding $P_{O_{PUSCH},b,f,c}(j)$ value being provided by higher layers, or a configuration for a corresponding $\alpha_{b,f,c}(j)$ being provided by higher layers, etc.).

The power control IE may carry information including values for one or more of the power control parameters 220 of Equation (1). Additionally, or alternatively, the UE 115-*a* or the network entity 105-*a*, or both, may separately determine the values for one or more of the power control parameters 220 of Equation (1). For example, the UE 115-*a* may determine the path loss value (e.g., $PL_{b,f,c}(q_d)$) irrespective of values provided in the power control IE. In this example, the power control IE may indicate reference signals to be used for the determination of the path loss value (e.g., $PL_{b,f,c}(q_d)$), but not an actual value for the path loss.

In the aspect of FIG. 2, in case where the accumulated transmit power control parameter 235 (e.g., $f_{b,f,c}(i, l)$) is reset, the UE 115-*a* may determine whether to reset the accumulated transmit power control parameter 235 (e.g., $f_{b,f,c}(i, l)$) to a null value or to anon-null value. The UE 115-*a* may determine a value for the reset accumulated transmit power control parameter 235 based on a difference (e.g., a comparison) between one or more values of the power control parameters 220 from before the message 210 and one or more values of the power control parameters 220 after the message 210. For example, the UE 115-*a* may determine a power delta value—$P_\Delta$ based on a comparison of a sum of one or more of the power control parameters 220 of Equation (1) before receiving the message 210 (i.e., before reception of the power control IE) and a sum of the one or more power control parameters 220 of Equation (1) after receiving the message 210 (i.e., after reception of the power control IE). As such, the $P_\Delta$ may be determined between the message 210 and the message 215.

In some aspects, the UE 115-*a* may determine the $P_\Delta$ by excluding one or more semi-static elements (i.e., semi-static power control parameters of the power control parameters 220) of Equation (1). The dynamic elements may correspond to at least one of a resource allocation or a transmission format. For example, the UE 115-*a* may exclude one or both of $$2^{\mu} \cdot M_{RB,b,f,c}^{PUSCH}(j)$$

and $\Delta_{TF,b,f,c}(i)$ for the $P_\Delta$ determination. However, the UE 115-*a* may include one or all static elements (i.e., static power control parameters of the power control parameters 220) of Equation (1). The static power control parameters may correspond to a path loss parameter and a target receive power parameter. For example, the UE 115-*a* may include one or both of $P_{O_{PUSCH},b,f,c}(j)$ or $\alpha_{b,f,c}(j) \cdot PL_{b,f,c}(q_d)$ for the $P_\Delta$ determination.

The UE 115-*a* may determine a sum of values of one or more of the power control parameters 220 of Equation (1), before receiving the message 210 (i.e., before reception of the power control IE), according to Equation (2).

$$\widetilde{P_{O\_PUSCH,b,f,c}}(j) + \widetilde{\alpha_{b,f,c}}(j) \cdot PL_{b,f,c}(q_d) + \widetilde{f_{b,f,c}}(i-n, l) \tag{2}$$

In Equation (2), the tilde above each of the power control parameters 220 represents that the values of these parameters are determined before receiving the message 210.

Additionally, the UE 115-*a* may determine a sum of values of one or more of the power control parameters 220 of Equation (1), after receiving the message 210 (i.e., after reception of the power control IE), according to Equation (3).

$$P_{O\_PUSCH,b,f,c}(j) + \alpha_{b,f,c}(j) \cdot PL_{b,fc}(q_d) + f_{b,f,c}(i, l) \tag{3}$$

The UE 115-*a* may then determine $P_\Delta$ according to Equation (4), which may be a difference between the sum of values for each of Equation (2) and Equation (3).

$$\widetilde{P_{O\_PUSCH,b,f,c}}(j) - P_{O\_PUSCH,b,f,c}(j) + (\widetilde{\alpha_{b,f,c}}(j) - \alpha_{b,f,c}(j)) \cdot PL_{b,fc}(q_d) + \widetilde{f_{b,f,c}}(i-n, l) - f_{b,f,c}(i, l) \tag{4}$$

Subsequent to determining a value of $P_\Delta$, the UE 115-*a* may determine whether $P_\Delta$ is greater than a threshold. For example, the UE 115-*a* may determine that $P_\Delta$ is greater than zero (i.e., $P_\Delta > 0$). If the UE 115-*a* determines that $P_\Delta > 0$, the UE 115-*a* may set (e.g., initialize) a value of the accumulated transmit power control parameter 235 to the value of $P_\Delta$. In other words, $f_{b,f,c}(i, l)$ is equal to $P_\Delta$. Thereby, the value of the accumulated transmit power control parameter 235 is different from a reset value of the accumulated transmit power control parameter 235 (e.g., a default reset value). Otherwise, the UE 115-*a* may set a value of the accumulated transmit power control parameter 235 to null (i.e., $f_{b,f,c}(i, l)$ is equal to 0). In other words, the UE 115-*a* may determine that $P_\Delta$ is less than or equal to the threshold. For example, the UE 115-*a* may determine that $P_\Delta$ is less than or equal to zero (i.e., $P_\Delta \leq 0$).

By enabling the UE 115-*a* to set a value of an accumulated transmit power control parameter 235 to be different from a reset value of the accumulated transmit power control parameter 235 (e.g., a default reset value), the UE 115-*a* may experience higher reliability for wireless communications with the network entity 105-*a*. For example, by enabling the UE 115-*a* to set the value of the accumulated transmit power control parameter 235 to $P_\Delta$, the UE 115-*a* may transmit the message 215 or subsequent messages using a higher uplink transmit power (e.g., the uplink transmit power 230), as a result of initializing a higher ramping offset for the uplink transmit power of the UE 115-*a*, and the message 215 may be successfully received at the network entity 105-*a*. Accordingly, the wireless communications system 200 supports power control for wireless communications, and in the aspect of RRC connection establishment increases a connection success rate for the UE 115-*a*.

Figure 3A:
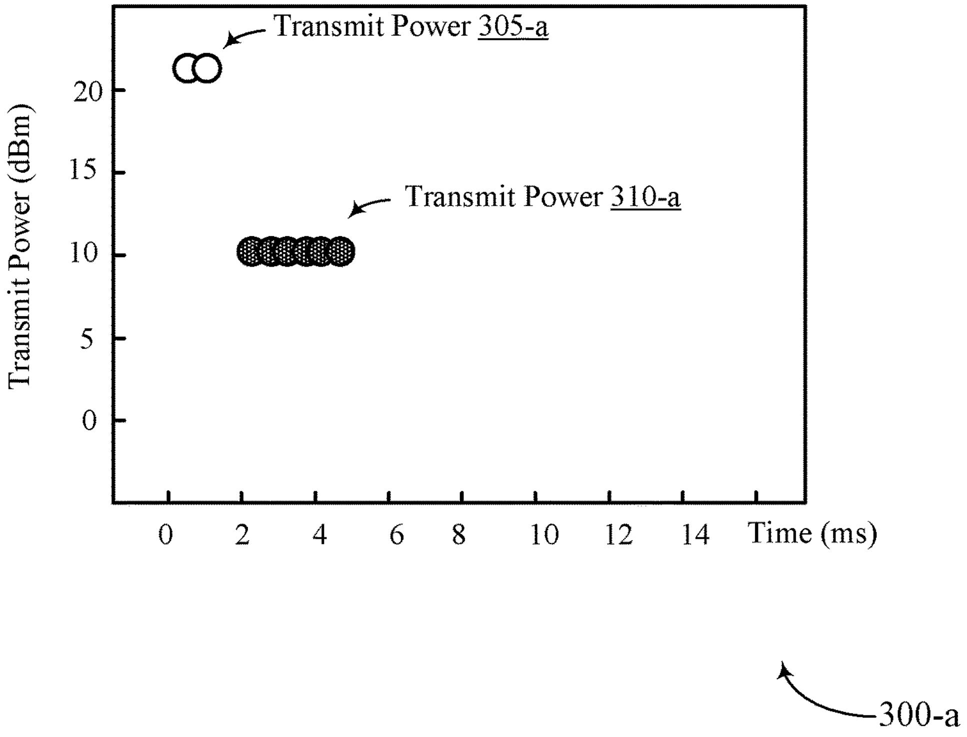
FIGS. 3A and 3B illustrates aspects of power graphs that support power control for wireless communications in accordance with one or more aspects of the present disclosure.

FIG. 3A illustrates an aspect of a power graph 300-*a* that supports power control for wireless communications in accordance with one or more aspects of the present disclosure. In some aspects, the power graph 300-*a* may implement or be implemented by aspects of the wireless communications systems 100 and 200 as described with reference to FIGS. 1 and 2, respectively. For example, the power graph 300-*a* may illustrate an uplink transmit power implemented by a UE 115, which may be an aspect of a UE 115 as described with reference to FIGS. 1 and 2, respectively. The power graph 300-*a* represents a transmit power in decibel milliwatts (dBm) vs. time in ms. For example, the power graph 300-*a* illustrates a first uplink transmit power 305-*a* and a second uplink transmit power 310-*a*. In the example of FIG. 3A, the first uplink transmit power 305-*a* may be associated with a first uplink transmission by a UE 115, while the second uplink transmit power 310-*a* may be associated with a subsequent second uplink transmission by the UE 115.

The first uplink transmit power 305-*a* may be 21 dBm, which the UE 115 may determine according to Equation (1). As described with reference to FIG. 2, a value of the second uplink transmit power 310-*a* may be based on a value of an accumulated transmit power control parameter being set to a reset value (e.g., a zero value). For example, the UE 115 may determine according to Equation (4) that a $P_\Delta$ is equal to or less than 0 dBm. Because $P_\Delta$ is equal to or less than zero, the UE 115 may set the accumulated transmit power control parameter equal to 0 dBm. In the example of FIG. 3A, this may result in the second uplink transmit power 310-*a* being 10.6 dBm, which may be determined according to Equation (1), and in which $f_{b,f,c}(i, l)$ is equal to 0 dBm. As a result, the subsequent second uplink transmission by the UE 115 using 10.6 dBm for the second uplink transmit power may be insufficient to successfully transmit the second uplink transmission to a network entity 105.

Figure 3B:
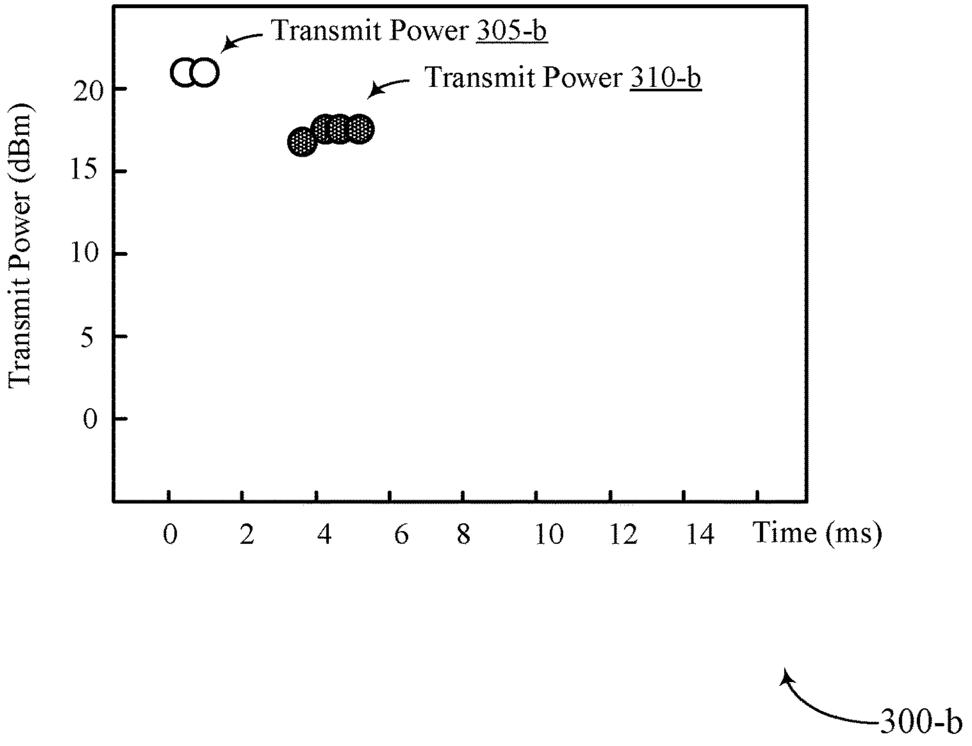

FIG. 3B illustrates an aspect of a power graph 300-*b* that supports power control for wireless communications in accordance with one or more aspects of the present disclosure. In some aspects, the power graph 300-*b* may implement or be implemented by aspects of the wireless communications systems 100 and 200 as described with reference to FIGS. 1 and 2, respectively. For example, the power graph 300-*b* may illustrate an uplink transmit power implemented by a UE 115, which may be an aspect of a UE 115 as described with reference to FIGS. 1 and 2, respectively. The power graph 300-*b* represents a transmit power in decibel milliwatts (dBm) vs. time in ms. The power graph 300-*b* illustrates a first uplink transmit power 305-*b* and a second uplink transmit power 310-*b*. In the example of FIG. 3B, the first uplink transmit power 305-*b* may be associated with a first uplink transmission by a UE 115, while the second uplink transmit power 310-*b* may be associated with a subsequent second uplink transmission by the UE 115.

For example, the first uplink transmit power 305-*b* may be 21 dBm. As described with reference to FIG. 2, a value of the second uplink transmit power 310-*b* may be based on a value of an accumulated transmit power control parameter. In the example of FIG. 3B, the value of the accumulated transmit power control parameter may be different from a reset value for the accumulated transmit power control parameter (e.g., a nonzero value). For example, the UE 115 may determine according to Equation (4) that a $P_\Delta$ is equal to 7.4 dBm. Because $P_\Delta$ is greater than a threshold, in this example, zero, the UE 115 may set the accumulated transmit power control parameter equal to 7.4 dBm. The UE 115 may thereby ramp to an uplink transmit power that is sufficient earlier compared to when the accumulated transmit power control parameter is set to a reset value as described here.

In the aspect of FIG. 3B, the second uplink transmit power 310-*b* may be 18 dBm, which may be determined according to Equation (1), and in which $f_{b,f,c}(i, l)$ is equal to 7.4 dBm. Because the accumulated transmit power control parameter is being set to value different from a reset value, the second uplink transmit power 310-*b* may be determined to be 18 dBm by the UE 115 according to Equation (1). As a result, the subsequent second uplink transmission by the UE 115 using 18 dBm for the second uplink transmit power 310-*b* may be sufficient to successfully transmit the second uplink transmission to a network entity 105.

Figure 4:
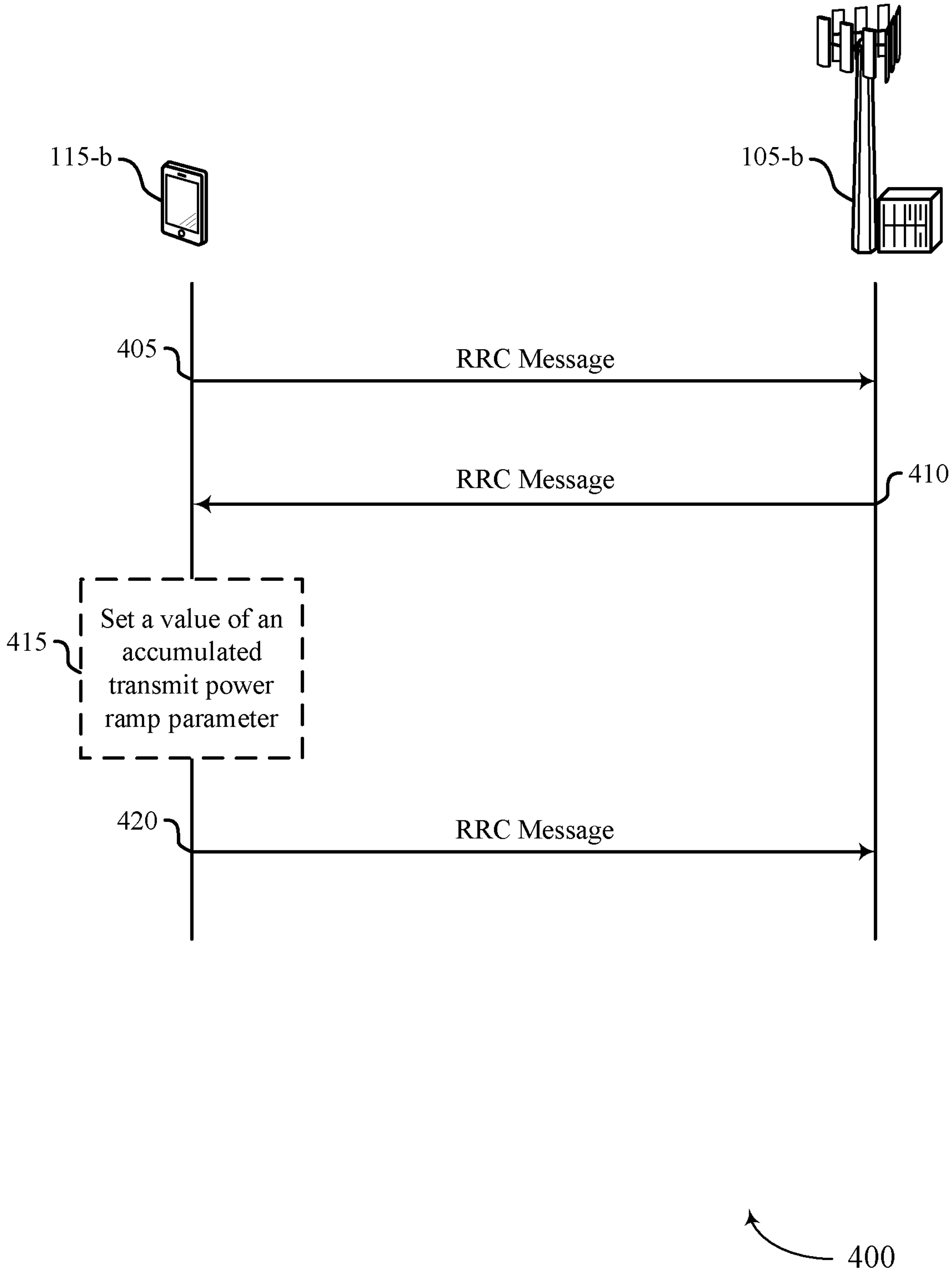
FIG. 4 illustrates an aspect of a process flow that supports power control for wireless communications in accordance with one or more aspects of the present disclosure.

FIG. 4 illustrates an aspect of a process flow 400 that supports power control for wireless communications in accordance with one or more aspects of the present disclosure. In some aspects, the process flow 400 may implement or be implemented by aspects of the wireless communications systems 100 and 200 as described with reference to FIGS. 1 and 2, respectively. For example, the process flow 400 may be implemented by a UE 115-*b* and a network entity 105-*b*, which may be an aspect of a UE 115 and a network entity 105 as described with reference to FIGS. 1 and 2, respectively. The process flow 400 may be implemented by the UE 115-*b* and the network entity 105-*b* to promote power saving, and, in some aspects, may promote higher reliability and lower latency wireless communications. In the following description of the process flow 400, the operations between the UE 115-*b* and the network entity 105-*b* may be transmitted in a different order than the example order shown, or the operations performed by the UE 115-*b* and the network entity 105-*b* may be performed in different orders or at different times. Some operations may also be omitted from the process flow 400, and other operations may be added to the process flow 400.

At 405, the UE 115-*b* may transmit, and the network entity 105-*b* may receive, a first RRC message. In some aspects, the UE 115-*b* may transmit the first RRC message based on a first set of values corresponding to a set of power control parameters as described with reference to FIG. 2. The set of power control parameters may include an accumulated transmit power control parameter. Additionally, the set of power control parameters may include a path loss parameter and a target receive power parameter. Additionally, or alternatively, the set of power control parameters may include a resource allocation or a transmission format.

At 410, the network entity 105-*b* may transmit, and the UE 115-*b* may receive, a second RRC message. In some aspects, the second RRC message may include information indicative of at least one of a second set of values corresponding to the set of power control parameters as described with reference to FIG. 2. In some aspects, the second RRC message may be an RRC reconfiguration message. In some other aspects, the second RRC message may be an RRC connection setup message.

At 415, the UE 115-*b* may set a value of an accumulated transmit power control parameter. The value corresponding to the accumulated transmit power control parameter may be based on a first difference between one or more of the first set of values from before the second RRC message and one or more of the second set of values, as described with reference to FIG. 2. The value of the accumulated transmit power control parameter may be equal to the first difference based on the first difference being greater than a threshold (e.g., greater than zero). In this example, the value of the accumulated transmit power control parameter may be different from a reset value of the accumulated transmit power control parameter. The reset value may be zero.

Alternatively, the value of the accumulated transmit power control parameter may be equal to the reset value based on the first difference being less than or equal to the threshold (e.g., less than or equal to zero). In some aspects, the reset value corresponds to a respective second value of the second set of values (e.g., a value of at least one of the power control parameters as described with reference to FIG. 2). Alternatively, the reset value may be different from a respective second value of the second set of values (e.g., a value of at least one of the power control parameters as described with reference to FIG. 2).

At 420, the UE 115-*b* may transmit, and the network entity 105-*b* may receive, a third RRC message. In some aspects, the UE 115-*b* may transmit the third RRC message using a second transmit power based on the value of the accumulated transmit power control parameter as described with reference to FIG. 2. The second transmit power may be sufficient for successful transmission of the third RRC message to the network entity 105-*b* when the value of the accumulated transmit power control parameter is different from a reset value of the accumulated transmit power control parameter, because a ramping offset for a respective transmit power of the UE 115-*b* may be greater compared to if the accumulated transmit power control parameter was reset to zero. In some aspects, the third RRC message may be an RRC reconfiguration complete message. In some other aspects, the third RRC message may be an RRC connection setup complete message.

Figure 5:
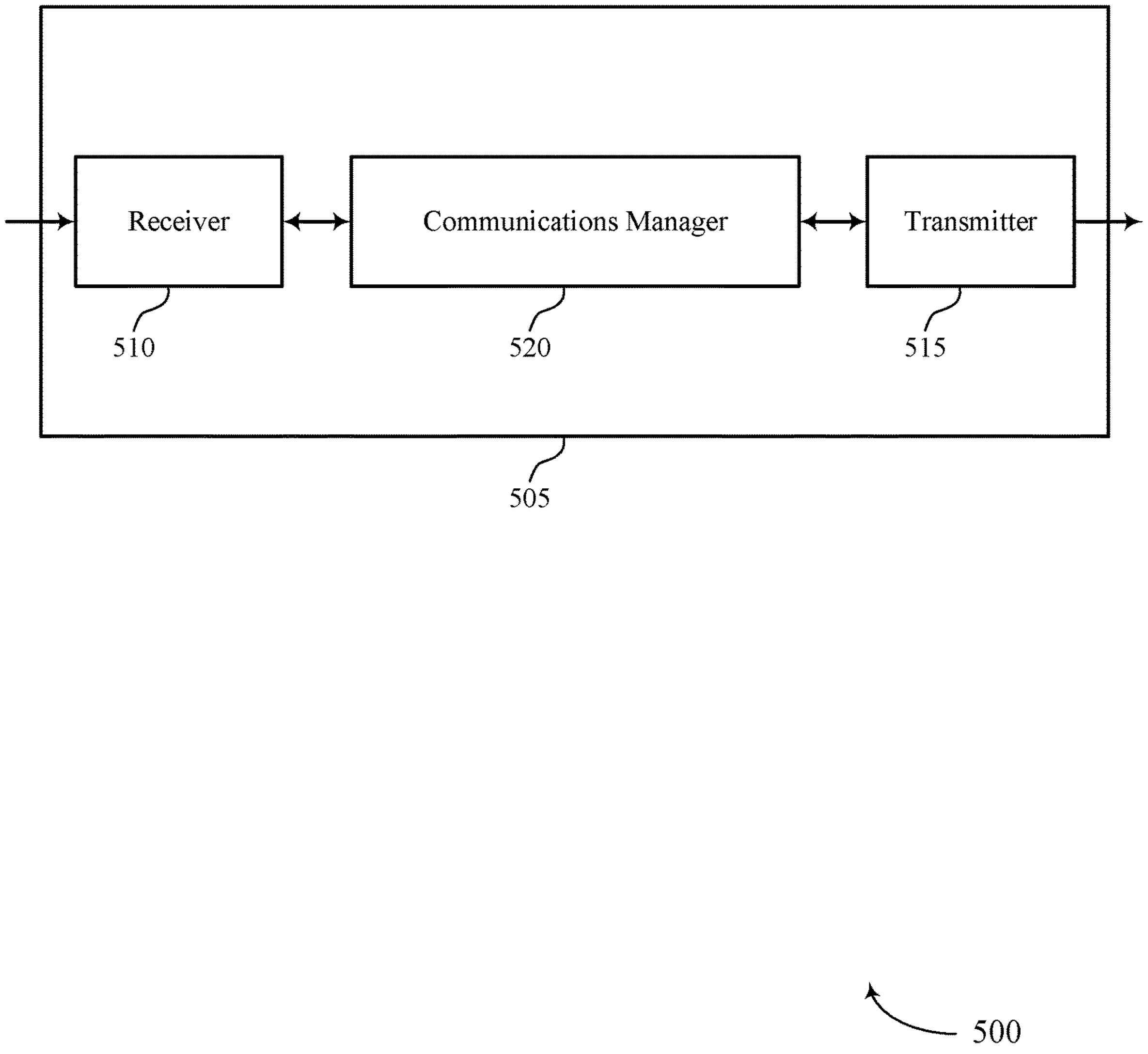
FIGS. 5 and 6 show block diagrams of devices that support power control for wireless communications in accordance with one or more aspects of the present disclosure.

FIG. 5 shows a block diagram 500 of a network node 505 that supports power control for wireless communications in accordance with one or more aspects of the present disclosure. The network node 505 may be an example of aspects of a UE 115, a network entity 105, or a base station 140, as described herein. The network node 505 may include a receiver 510, a transmitter 515, and a communications manager 520. The network node 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to uplink power compensation). Information may be passed on to other components of the network node 505. The receiver 510 may utilize a single antenna or a set of multiple antennas.

The transmitter 515 may provide a means for transmitting signals generated by other components of the network node 505. For example, the transmitter 515 may transmit information such as packets, user data, control information, or any combination thereof associated with various information channels (e.g., control channels, data channels, information channels related to uplink power compensation). In some aspects, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of uplink power compensation as described herein. For example, the communications manager 520, the receiver 510, the transmitter 515, or various combinations or components thereof may support a method for performing one or more of the functions described herein.

In some aspects, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication in accordance with aspects as disclosed herein. For example, the communications manager 520 may be configured as or otherwise support a means for transmitting a first message using a first transmit power based on a first set of multiple values corresponding to a set of multiple power control parameters, where the set of multiple power control parameters includes an accumulated transmit power control parameter. The communications manager 520 may be configured as or otherwise support a means for receiving a second message including information indicative of at least one of a second set of multiple values corresponding to the set of multiple power control parameters. The communications manager 520 may be configured as or otherwise support a means for transmitting a third message using a second transmit power based on a value corresponding to the accumulated transmit power control parameter, where the value corresponding to the accumulated transmit power control parameter is based on a first difference between one or more of the first set of multiple values from before the second message and one or more of the second set of multiple values.

By including or configuring the communications manager 520 in accordance with aspects as described herein, the network node 505 (e.g., a processor controlling or otherwise coupled with the receiver 510, the transmitter 515, the communications manager 520, or a combination thereof) may support techniques for reduced power consumption.

Figure 6:
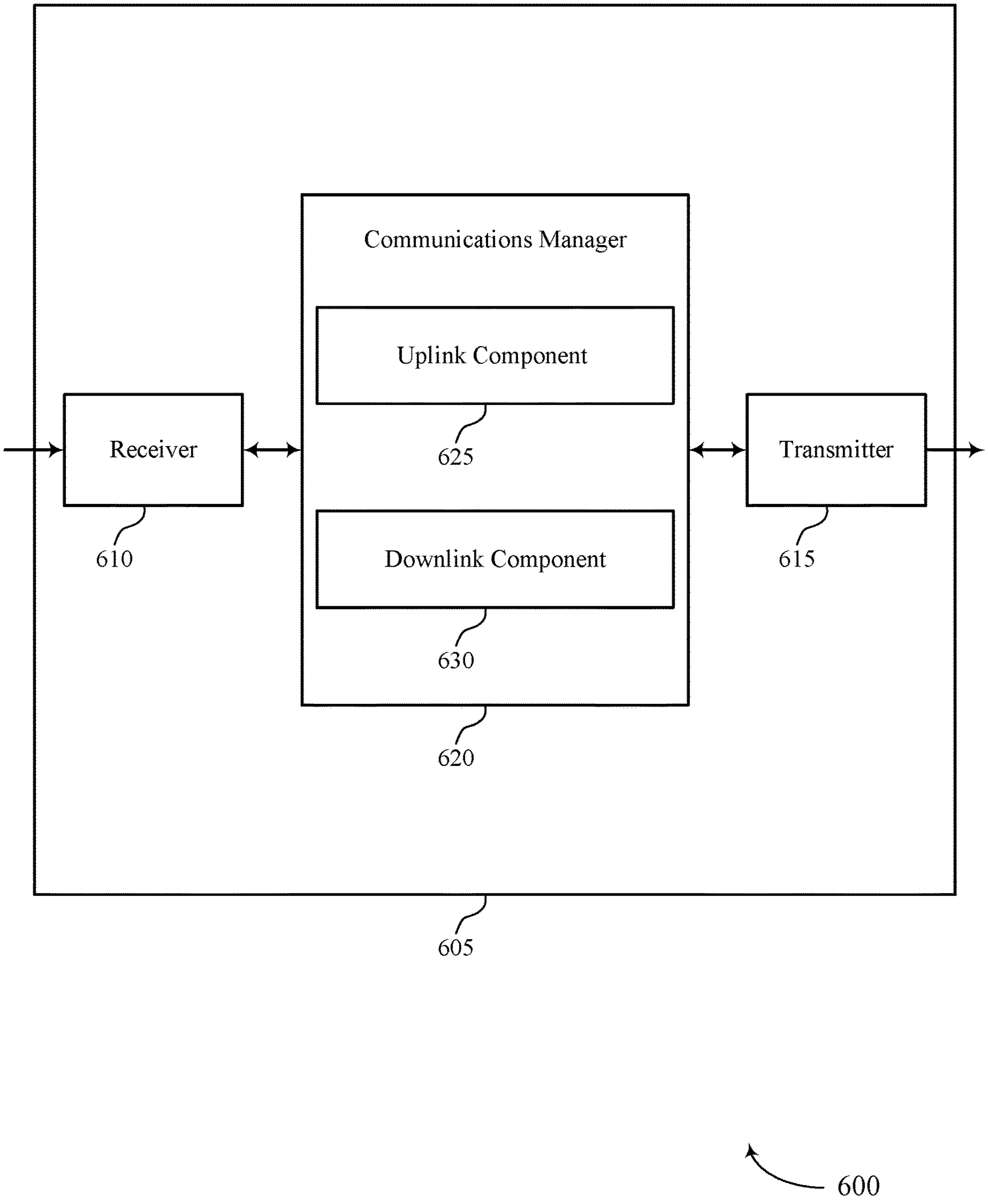

FIG. 6 shows a block diagram 600 of a network node 605 that supports power control for wireless communications in accordance with one or more aspects of the present disclosure. The network node 605 may be an example of aspects of a network node 505 or a UE 115, a network entity 105, or a base station 140, as described herein. The network node 605 may include a receiver 610, a transmitter 615, and a communications manager 620. The network node 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to uplink power compensation). Information may be passed on to other components of the network node 605. The receiver 610 may utilize a single antenna or a set of multiple antennas.

The transmitter 615 may provide a means for transmitting signals generated by other components of the network node 605. For example, the transmitter 615 may transmit information such as packets, user data, control information, or any combination thereof associated with various information channels (e.g., control channels, data channels, information channels related to uplink power compensation). In some aspects, the transmitter 615 may be co-located with a receiver 610 in a transceiver module. The transmitter 615 may utilize a single antenna or a set of multiple antennas.

The network node 605, or various components thereof, may be an aspect of means for performing various aspects of uplink power compensation as described herein. For example, the communications manager 620 may include an uplink component 625, a downlink component 630, or any combination thereof. The communications manager 620 may be an example of aspects of a communications manager 520 as described herein. In some aspects, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication in accordance with aspects as disclosed herein. The uplink component 625 may be configured as or otherwise support a means for transmitting a first message using a first transmit power based on a first set of multiple values corresponding to a set of multiple power control parameters, where the set of multiple power control parameters includes an accumulated transmit power control parameter. The downlink component 630 may be configured as or otherwise support a means for receiving a second message including information indicative of at least one of a second set of multiple values corresponding to the set of multiple power control parameters. The uplink component 625 may be configured as or otherwise support a means for transmitting a third message using a second transmit power based on a value corresponding to the accumulated transmit power control parameter, where the value corresponding to the accumulated transmit power control parameter is based on a first difference between one or more of the first set of multiple values from before the second message and one or more of the second set of multiple values.

Figure 7:
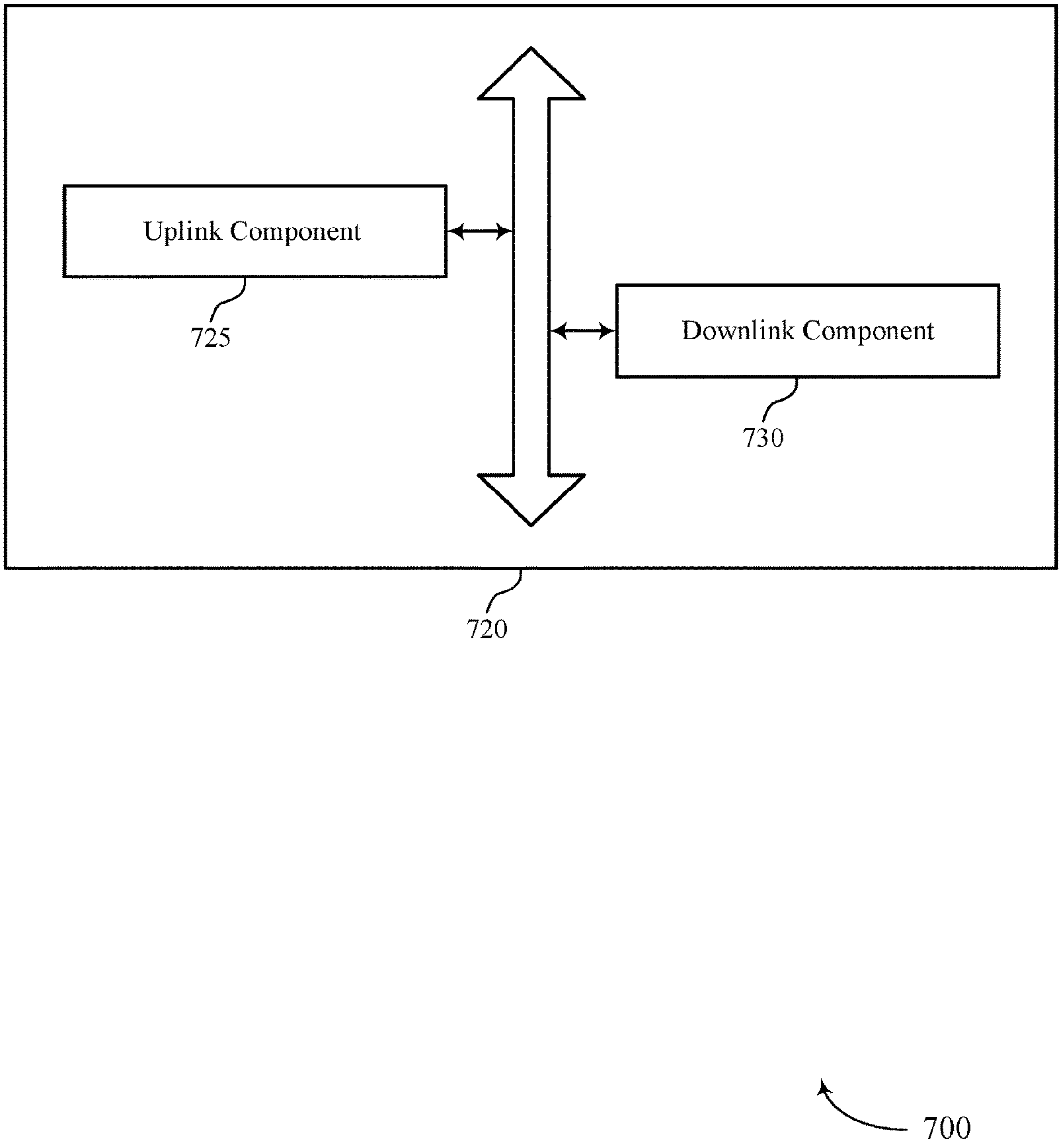
FIG. 7 shows a block diagram of a communications manager that supports power control for wireless communications in accordance with one or more aspects of the present disclosure.

FIG. 7 shows a block diagram 700 of a communications manager 720 that supports power control for wireless communications in accordance with one or more aspects of the present disclosure. The communications manager 720 may be an example of aspects of a communications manager 520, a communications manager 620, or both, as described herein. The communications manager 720, or various components thereof, may be an example of means for performing various aspects of power control for wireless communications as described herein. For example, the communications manager 720 may include an uplink component 725, a downlink component 730, or any combination thereof. Each of these components may communicate, directly or indirectly, with one another (e.g., via one or more buses).

The communications manager 720 may support wireless communication in accordance with aspects as disclosed herein. The uplink component 725 may be configured as or otherwise support a means for transmitting a first message using a first transmit power based on a first set of multiple values corresponding to a set of multiple power control parameters, where the set of multiple power control parameters includes an accumulated transmit power control parameter. The downlink component 730 may be configured as or otherwise support a means for receiving a second message including information indicative of at least one of a second set of multiple values corresponding to the set of multiple power control parameters. The uplink component 725 may be configured as or otherwise support a means for transmitting a third message using a second transmit power based on a value corresponding to the accumulated transmit power control parameter, where the value corresponding to the accumulated transmit power control parameter is based on a first difference between one or more of the first set of multiple values from before the second message and one or more of the second set of multiple values.

In some aspects, the value of the accumulated transmit power control parameter is equal to the first difference based on the first difference being greater than a threshold. In some aspects, the value of the accumulated transmit power control parameter is different from a reset value of the accumulated transmit power control parameter. In some aspects, the reset value corresponds to a respective second value of the second set of multiple values. In some aspects, the reset value is zero. In some aspects, the value of the accumulated transmit power control parameter is different from a respective value of the second set of multiple values.

In some aspects, the set of multiple power control parameters includes a path loss parameter and a target receive power parameter. In some aspects, the first difference between the one or more of the first plurality of values and the one or more of the second plurality of values is irrespective of at least one of a resource allocations or a transmission format. In some aspects, the value of the accumulated transmit power control parameter is equal to the first difference based on the first difference being less than or equal to a threshold.

In some aspects, the value of the accumulated transmit power control parameter is a reset value of the power control parameter. In some aspects, the reset value corresponds to a respective second value of the second set of multiple values. In some aspects, the reset value is zero.

In some aspects, the second message is an RRC connection setup message and the third message is an RRC connection setup complete message. In some aspects, the second message is an RRC reconfiguration message and the third message is an RRC reconfiguration complete message.

In some aspects, the accumulated transmit power control parameter corresponds to a ramping offset for a respective transmit power of the network node. In some aspects, the ramping offset is a sum of one or more previously received transmit power control parameter.

In some aspects, the first difference is indicative of a reset of the accumulated transmit power control parameter. In some aspects, one or more of the second set of multiple values. In some aspects, one or more values based on one or more of the second set of multiple values.

In some aspects, the value corresponding to the accumulated transmit power control parameter is based on a second difference between one or more of the first plurality of values from before the second message and at least one of: one or more of the second plurality of values, or one or more values based on one or more of the second plurality of values.

Figure 8:
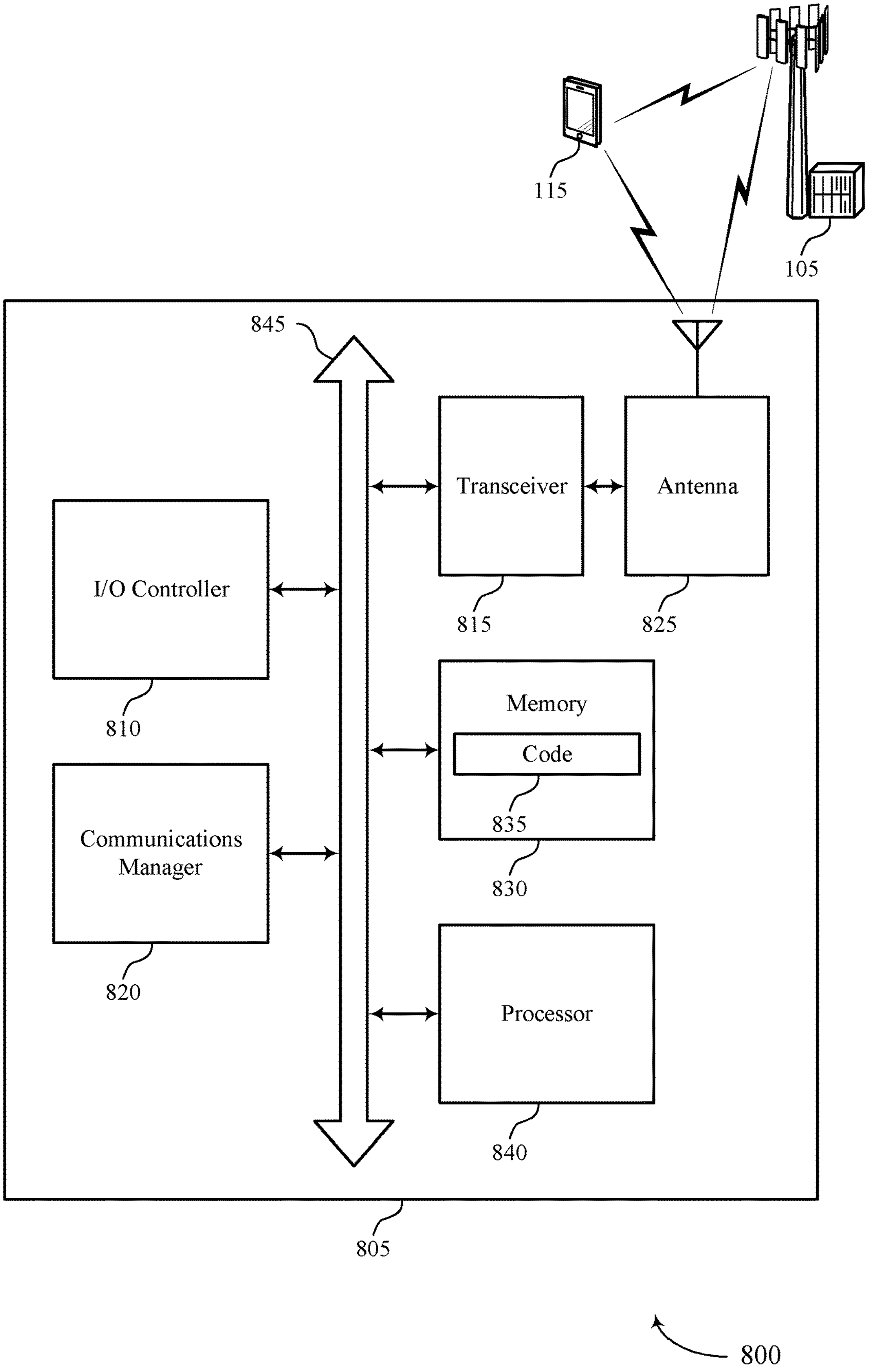
FIG. 8 shows a diagram of a system including a device that supports power control for wireless communications in accordance with one or more aspects of the present disclosure.

FIG. 8 shows a diagram of a system 800 including a network node 805 that supports power control for wireless communications in accordance with one or more aspects of the present disclosure. The network node 805 may be an aspect of or include the components of a network node 505, a network node 605, or a UE 115, a network entity 105, or a base station 140, as described herein. The network node 805 may communicate (e.g., wirelessly) with one or more network entities 105, one or more UEs 115, or any combination thereof. The network node 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the network node 805. The I/O controller 810 may also manage peripherals not integrated into the network node 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the network node 805 via the I/O controller 810 or via hardware components controlled by the I/O controller 810.

In some cases, the network node 805 may include a single antenna 825. However, in some other cases, the network node 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an aspect of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the network node 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or network nodes.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the network node 805 to perform various functions (e.g., functions or tasks supporting uplink power compensation). For example, the network node 805 or a component of the network node 805 may include a processor 840 and memory 830 coupled with or to the processor 840, the processor 840 and memory 830 configured to perform various functions described herein.

The communications manager 820 may support wireless communication in accordance with aspects as disclosed herein. For example, the communications manager 820 may be configured as or otherwise support a means for transmitting a first message using a first transmit power based on a first set of multiple values corresponding to a set of multiple power control parameters, where the set of multiple power control parameters includes an accumulated transmit power control parameter. The communications manager 820 may be configured as or otherwise support a means for receiving a second message including information indicative of at least one of a second set of multiple values corresponding to the set of multiple power control parameters. The communications manager 820 may be configured as or otherwise support a means for transmitting a third message using a second transmit power based on a value corresponding to the accumulated transmit power control parameter, where the value corresponding to the accumulated transmit power control parameter is based on a first difference between one or more of the first set of multiple values from before the second message and one or more of the second set of multiple values.

By including or configuring the communications manager 820 in accordance with aspects as described herein, the network node 805 may support techniques for improved communication reliability and reduced latency.

In some aspects, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some aspects, one or more functions described with reference to the communications manager 820 may be supported by or performed by the processor 840, the memory 830, the code 835, or any combination thereof. For example, the code 835 may include instructions executable by the processor 840 to cause the network node 805 to perform various aspects of uplink power compensation as described herein, or the processor 840 and the memory 830 may be otherwise configured to perform or support such operations.

Figure 9:
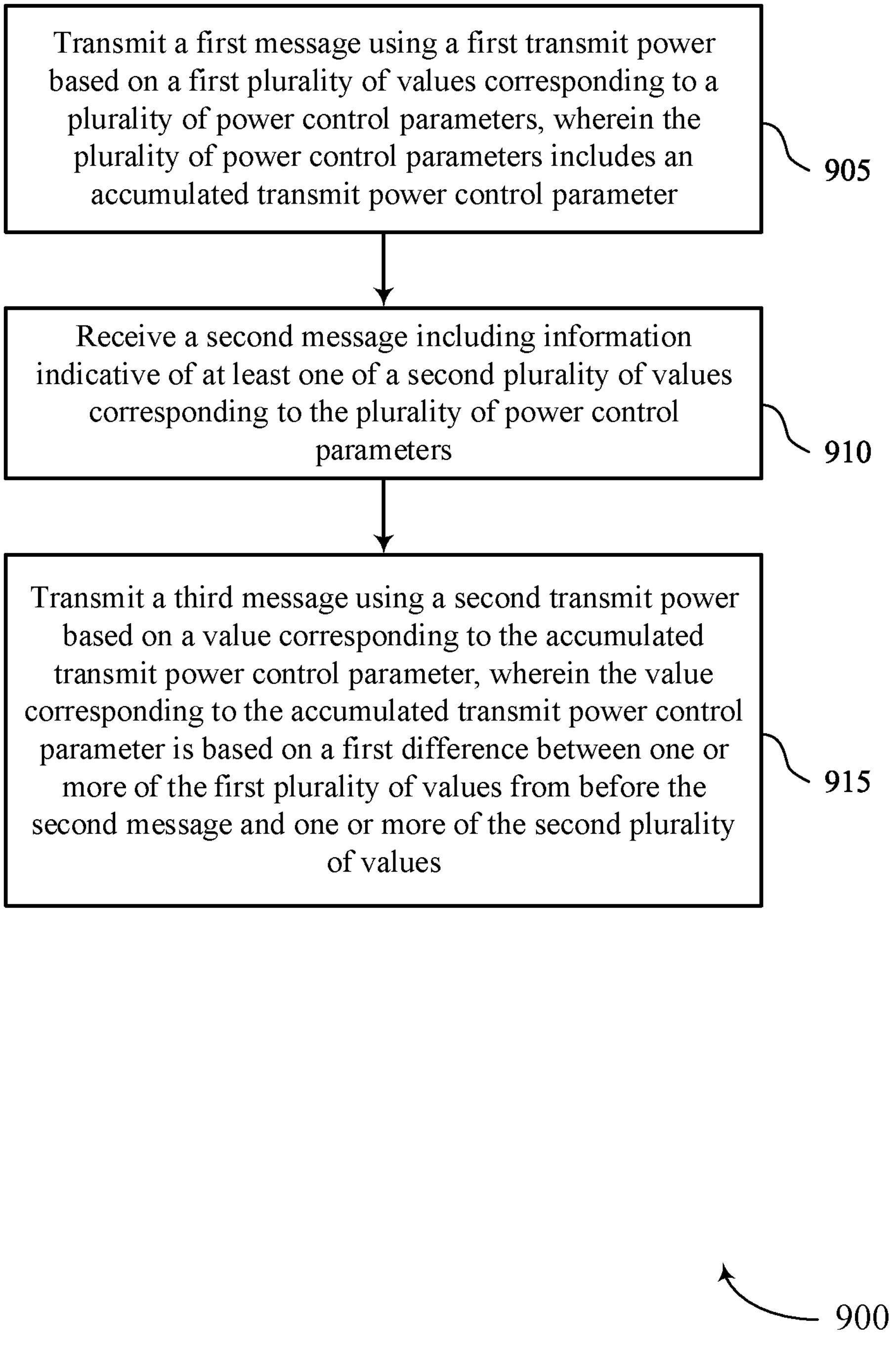
FIG. 9 shows a flowchart illustrating methods that support power control for wireless communications in accordance with one or more aspects of the present disclosure.

FIG. 9 shows a flowchart illustrating a method 900 that supports power control for wireless communications in accordance with one or more aspects of the present disclosure. The operations of the method 900 may be implemented by a UE or its components as described herein. For example, the operations of the method 900 may be performed by a UE 115 as described with reference to FIGS. 1 through 8. In some aspects, a UE may execute a set of instructions to control the functional elements of the UE to perform the described functions. Additionally, or alternatively, the UE may perform aspects of the described functions using special-purpose hardware.

At 905, the method may include transmitting a first message using a first transmit power based on a first set of multiple values corresponding to a set of multiple power control parameters, where the set of multiple power control parameters includes an accumulated transmit power control parameter. The operations of 905 may be performed in accordance with aspects as disclosed herein. In some examples, aspects of the operations of 905 may be performed by an uplink component 725 as described with reference to FIG. 7.

At 910, the method may include receiving a second message including information indicative of at least one of a second set of multiple values corresponding to the set of multiple power control parameters. The operations of 910 may be performed in accordance with aspects as disclosed herein. In some examples, aspects of the operations of 910 may be performed by a downlink component 730 as described with reference to FIG. 7.

At 915, the method may include transmitting a third message using a second transmit power based on a value corresponding to the accumulated transmit power control parameter, where the value corresponding to the accumulated transmit power control parameter is based on a first difference between one or more of the first set of multiple values from before the second message and one or more of the second set of multiple values. The operations of 915 may be performed in accordance with aspects as disclosed herein. In some examples, aspects of the operations of 915 may be performed by an uplink component 725 as described with reference to FIG. 7.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a network node, comprising: transmitting a first message using a first transmit power based on a first plurality of values corresponding to a plurality of power control parameters, wherein the plurality of power control parameters includes an accumulated transmit power control parameter; receiving a second message including information indicative of at least one of a second plurality of values corresponding to the plurality of power control parameters; and transmitting a third message using a second transmit power based on a value corresponding to the accumulated transmit power control parameter, wherein the value corresponding to the accumulated transmit power control parameter is based on a first difference between one or more of the first plurality of values from before the second message and one or more of the second plurality of values.

Aspect 2: The method of aspect 1, wherein the value of the accumulated transmit power control parameter is equal to the first difference based on the first difference being greater than a threshold.

Aspect 3: The method of aspect 2, wherein the value of the accumulated transmit power control parameter is different from a reset value of the accumulated transmit power control parameter.

Aspect 4: The method of aspect 3, wherein the reset value corresponds to a respective second value of the second plurality of values.

Aspect 5: The method of any of aspects 3 through 4, wherein the reset value is zero.

Aspect 6: The method of any of aspects 2 through 5, wherein the value of the accumulated transmit power control parameter is different from a respective value of the second plurality of values.

Aspect 7: The method of any of aspects 1 through 6, wherein the plurality of power control parameters includes a path loss parameter and a target receive power parameter.

Aspect 8: The method of any of aspects 1 through 7, wherein the first difference is irrespective of at least one of a resource allocation or a transmission format.

Aspect 9: The method of any of aspects 1 through 8, wherein the value of the accumulated transmit power control parameter is equal to the first difference based on the first difference being less than or equal to a threshold.

Aspect 10: The method of aspect 9, wherein the value of the accumulated transmit power control parameter is a reset value of the power control parameter.

Aspect 11: The method of aspect 10, wherein the reset value corresponds to a respective second value of the second plurality of values.

Aspect 12: The method of any of aspects 10 through 11, wherein the reset value is zero.

Aspect 13: The method of any of aspects 1 through 12, wherein the second message is a radio resource control connection setup message and the third message is a radio resource control connection setup complete message.

Aspect 14: The method of any of aspects 1 through 13, wherein the second message is a radio resource control reconfiguration message and the third message is a radio resource control reconfiguration complete message.

Aspect 15: The method of any of aspects 1 through 14, wherein the accumulated transmit power control parameter corresponds to a ramping offset for a respective transmit power of the network node.

Aspect 16: The method of aspect 15, wherein the ramping offset is a sum of one or more previously received transmit power control parameter.

Aspect 17: The method of any of aspects 1 through 16, wherein the first difference is indicative of a reset of the accumulated transmit power control parameter.

Aspect 18: The method of any of aspects 1 through 17, wherein the value corresponding to the accumulated transmit power control parameter is based on a second difference between one or more of the first plurality of values from before the second message and at least one of one or more of the second plurality of values, or one or more values based on one or more of the second plurality of values.

Aspect 19: A network node for wireless communication, comprising a memory; and at least one processor coupled to the memory, wherein the at least one processor is configured to perform a method of any of aspects 1 through 18.

Aspect 20: A network node for wireless communication, comprising at least one means for performing a method of any of aspects 1 through 18.

Aspect 21: A non-transitory computer-readable medium having code for wireless communication stored thereon that, when executed by a network node, causes the network node to perform a method of any of aspects 1 through 18.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other aspects and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of information, one or more conditions, one or more factors, or the like. For example, the phrase "based on A" (where "A" may be information, a condition, a factor, or the like) may be interpreted as: "based at least on A." In other words, as used herein, the phrase "based on" shall be construed in the same manner as the phrase "based at least on."

The term "determine" or "determining" encompasses a variety of actions and, therefore, "determining" can include calculating, computing, processing, deriving, investigating, looking up (such as via looking up in a table, a database or another data structure), ascertaining, and the like. Also, "determining" can include receiving (such as receiving information), accessing (such as accessing data in a memory), and the like. Also, "determining" can include resolving, obtaining, selecting, choosing, establishing, and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the examples that may be implemented or that are within the scope of the claims. The term "aspect" or "example" used herein means "serving as an aspect, example, instance, or illustration," and not "preferred" or "advantageous over other aspects." The detailed description includes specific details for the purpose of providing an understanding of the described techniques. These techniques, however, may be practiced without these specific details. In some instances, structures and devices are shown in block diagram form in order to avoid obscuring the concepts of the described aspects.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the aspects and designs described herein but is to be accorded the broadest scope consistent with the principles and novel features disclosed herein.

What is claimed is:

1. A network node for wireless communication, comprising:

a memory; and at least one processor coupled to the memory, wherein the at least one processor is configured to:

transmit a first message using a first transmit power based on a first value corresponding to an accumulated transmit power control parameter;

receive a second message including information that triggers the accumulated transmit power control parameter to be reset to a reset value; and transmit, based on receipt of the second message, a third message with the accumulated transmit power control parameter that is based on the transmit power of the first message.

2. The network node of claim 1, wherein the reset value is zero.

3. The network node of claim 1, wherein the first transmit power is based on a path loss parameter and a target receive power parameter.

4. The network node of claim 1, wherein the second message is a radio resource control connection setup message and the third message is a radio resource control connection setup complete message.

5. The network node of claim 1, wherein the second message is a radio resource control reconfiguration message and the third message is a radio resource control reconfiguration complete message.

6. The network node of claim 1, wherein the accumulated transmit power control parameter corresponds to a ramping offset.

7. The network node of claim 1, wherein the reset value is less than the first value.

8. A network node for wireless communication, comprising:

a memory; and at least one processor coupled to the memory, wherein the at least one processor is configured to:

transmit a first message using a first transmit power based on a first value corresponding to an accumulated transmit power control parameter;

receive a second message including information that triggers the accumulated transmit power control parameter to be reset to a reset value; and transmit, based on receipt of the second message, a third message using a second transmit power based on a second value corresponding to the accumulated transmit power control parameter, wherein the second value is different than the reset value.

9. The network node of claim 8, wherein the reset value is zero.

10. The network node of claim 8, wherein the first transmit power is based on a path loss parameter and a target receive power parameter.

11. The network node of claim 8, wherein the second message is a radio resource control connection setup message and the third message is a radio resource control connection setup complete message.

12. The network node of claim 8, wherein the second message is a radio resource control reconfiguration message and the third message is a radio resource control reconfiguration complete message.

13. The network node of claim 8, wherein the accumulated transmit power control parameter corresponds to a ramping offset.

14. The network node of claim 8, wherein the reset value is less than the first value.

15. The network node of claim 8, wherein the second value is based on the first transmit power.

* * * * *